US007710595B2

(12) United States Patent
Lochmüller

(10) Patent No.: US 7,710,595 B2
(45) Date of Patent: May 4, 2010

(54) METHOD FOR IDENTIFYING A SINGLE PANEL COMPRISING A PRINTED IMAGE OF DEFECTIVE QUALITY ON PRINTED MATERIAL COMPRISING SEVERAL PANELS

(75) Inventor: Jens Lochmüller, Bielefeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 909 days.

(21) Appl. No.: 10/591,915

(22) PCT Filed: Mar. 15, 2005

(86) PCT No.: PCT/EP2005/051163

§ 371 (c)(1),
(2), (4) Date: Sep. 7, 2006

(87) PCT Pub. No.: WO2005/092620

PCT Pub. Date: Oct. 6, 2005

(65) Prior Publication Data

US 2007/0181026 A1 Aug. 9, 2007

(30) Foreign Application Priority Data

Mar. 23, 2004 (DE) ....................... 10 2004 014 549
Jun. 17, 2004 (DE) ....................... 10 2004 029 140

(51) Int. Cl.
*G06F 15/00* (2006.01)
*G06K 1/00* (2006.01)

(52) U.S. Cl. ....................... 358/1.9; 358/3.26; 358/1.14

(58) Field of Classification Search .................. 358/1.1, 358/1.9, 3.26, 3.27, 1.14, 501, 401, 463; 382/254, 275, 309
See application file for complete search history.

(56) References Cited

U.S. PATENT DOCUMENTS 5,384,859 A * 1/1995 Bolza-Schunemann et al. .. 382/112

(Continued)

FOREIGN PATENT DOCUMENTS

DE 44 32 371 A1 3/1996

(Continued)

OTHER PUBLICATIONS

Kleeberg, Dieter, "Die vernetzte Druckerei," KBA.

(Continued)

*Primary Examiner*—Thomas D Lee
(74) *Attorney, Agent, or Firm*—Jones, Tullar & Cooper, P.C.

(57) ABSTRACT

A method is used to identify a single panel or proof copy that has a printed image of defective quality on printed material that includes several such panels or proof copies. An image of at least part of the printed material is captured photographically. Data, that correlates with the captured image, is analyzed to determine if a defect exists which reduces the quality of the printed image on the printed material. Information with respect to the specific location of the proof copy which contains the defect is determined by comparing the data which correlates with the captured image, to an electronically generated data record which includes information, with respect to the arrangement, form or size of the individual panel that is located on the printed material. An image processing system may perform the comparison of the data record for the form of the individual panel or proof copy on the printed material. That data record may originate from a punching die which is used for separating the individual panels or proof copies of the printed material.

24 Claims, 2 Drawing Sheets

U.S. PATENT DOCUMENTS

| | | | | |
|---|---|---|---|---|
| 6,333,987 | B1 * | 12/2001 | Reinhard et al. | 382/112 |
| 6,880,458 | B2 | 4/2005 | Munz et al. | |
| 2004/0177783 | A1 * | 9/2004 | Seymour | 101/484 |
| 2005/0223922 | A1 | 10/2005 | Giori et al. | |

FOREIGN PATENT DOCUMENTS

| | | | |
|---|---|---|---|
| DE | 200 10 920 | U1 | 10/2000 |
| DE | 202 13 431 | U1 | 12/2002 |
| DE | 203 03 574 | U1 | 6/2003 |
| EP | 1 167 036 | A1 | 6/2001 |
| EP | 1 403 045 | A2 | 3/2004 |
| WO | WO 01/85457 | A1 | 11/2001 |

OTHER PUBLICATIONS

"PDF und Verpackungen," Deutscher Druckier Nr. 14/Apr. 22, 2004.

Daun, Stefan; Lucas, Georg; Schonut, Jurgen, "Specification of the CIP3 Print Production Format," May 27, 1997, Fraunhofer Institute for Computer Graphics.

Kleeberg, Dieter, "Die vernetzte Druckerei," KBA, Nr. 14 drupa 2000.

Daun, Stefan; Lucas, Georg; Schonut, Jurgen, "Specificaiton of the CIP3 Print Production Format," Jun. 2, 1998, Fraunhofer Institute for Computer Graphics.

* cited by examiner

METHOD FOR IDENTIFYING A SINGLE PANEL COMPRISING A PRINTED IMAGE OF DEFECTIVE QUALITY ON PRINTED MATERIAL COMPRISING SEVERAL PANELS

CROSS-REFERENCE TO RELATED APPLICATIONS

This patent application is the U.S. national phase, under 35 USC 371, of PCT/EP2005/051163, filed Mar. 15, 2005; published as WO 2005/092620 A2 and A3 on Oct. 6, 2005 and claiming priority to DE 10 2004 014 549.0, filed Mar. 23, 2004, and to DE 10 2004 029 140.3, filed Jun. 17, 2004, the disclosures of which are expressly incorporated herein by reference.

FIELD OF THE INVENTION

The present invention is directed to methods for identifying a single proof copy, containing a printed image of defective quality, on imprinted material comprising several proof copies. An image of at least a portion of the imprinted material is taken photographically. Data correlated with the photograph are checked to see if a quality reducing error exists on the printed material.

BACKGROUND OF THE INVENTION

A printing press, and in particular a sheet-fed offset printing press, is known from DE 200 10 920 U1 and EP 1 167 036 A1. To determine the quality of a printed image which is arranged on the imprinted material, an image registration device registers the imprinted material. An evaluation device, which is connected with the image registration device, compares the image of the imprinted material, which was registered by the image registration device, with a reference image. The imprinted material is covered with a plurality of identical printed images. The evaluation device only evaluates a part of the printed images on the image of the imprinted material. In the case of an agreement of the evaluated partial amount with the reference image, the evaluation device issues a signal to a counting device for registering the partial amount.

A method for identifying a single proof copy, which contains a printed image of defective quality on an imprinted material containing several proof copies is known from DE 44 32 371 A1. An inspection system takes a picture of the imprinted material with a camera and processes data from the picture taken in an image processing system. The image processing system compares the data from the picture taken with a single proof copy in a data set relating to the imprinted material.

The technical article by Dieter Kleeberg "The Linked Printing Plant," in the supplement to the company publication KBA Report No. 14 of Koenig & Bauer AG, Wurzburg, 2000, pp. 4, 6, 7, discloses that it is known to combine positional data for further processing, and data for inline quality control into a data set by the use of a uniform data file, such as, for example, CIP3-PPF-data files. By proceeding the data in this way, it is only necessary to compile a data set once for use in the identification of individual error-containing proof copies and for further processing.

An image inspection system for a printing press is known from DE 203 03 574 U1. The imprinted material, which was imprinted with proof copies, is recorded by an image recording system. The image signals so obtained are processed in a downstream-connected image processing arrangement. A printing device, which can be controlled in accordance with the image signals, is arranged downstream of the image recording system. By use of the printing device, markings for identifying areas determined to be in error can be created at predetermined locations of the imprinted material. As a result of those markings, misprinted proof copies can be removed in an appropriately embodied further processing device.

A method for use in determining the position and/or the shape of at least one marker on a web to be imprinted is known from the later published EP 1 403 045 A2. The position and/or the shape of that at least one marker in the image to be printed is determined by the use of pre-press data.

SUMMARY OF THE INVENTION

The object of the present invention is directed to providing methods for identifying a single proof copy containing a printed image of defective quality and which single defective quality image is on an imprinted material containing several proof copies. The identification of the single proof copy with the image of defective quality takes place without the aid of a printed reference which has previously been imprinted material. An efficient production run results for the identification of individual such defective proof copies and for the establishment of a data set which can be used for performing this identification.

In accordance with the present invention, this object is attained by taking an image of at least one portion of the imprinted material photographically. Data which is correlated with the photograph so taken is checked to determine if an error, which reduces the quality of the printed image exists on the printed material. Information regarding the location of the proof copy having the printed image quality reducing error is developed. The location of that proof copy, with the error, is determined by a comparison of the data correlated with the photographed image with an electronically generated data set which contains information regarding the arrangement of the proof copies or of their form or size, as they are arranged on the imprinted material.

The advantages to be gained by the present invention rest, in particular, in that an imprinted material, and in particular a sheet, which has been printed by a printing press, and containing several proof copies, need not be treated as waste material, if only a single proof copy of the imprinted material has a printed image of defective quality. The proof copy of the imprinted material, which includes the printed image of defective quality, can be separated in a process step following the printing process, so that all of the other proof copies, with printed images of good quality, can be used for the intended purpose. A single proof copy of the imprinted material, with the printed image of defective quality can be unequivocally identified. It is quite advantageous that every one of the methods in accordance with the present invention is suitable for use to identify individual proof copies of any arbitrary shape, and of any arbitrary orientation, on the imprinted material. A set-up phase of the printing press is unaffected by the method for the identification of a single proof copy of the imprinted material with a printed image of defective quality in accordance with the present invention. No additional process step is required in the course of the set-up phase of the printing press. Such an additional process step could, for example, consist in the evaluation of a set-up sheet which would have to be specially prepared.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENT

Figure 1:
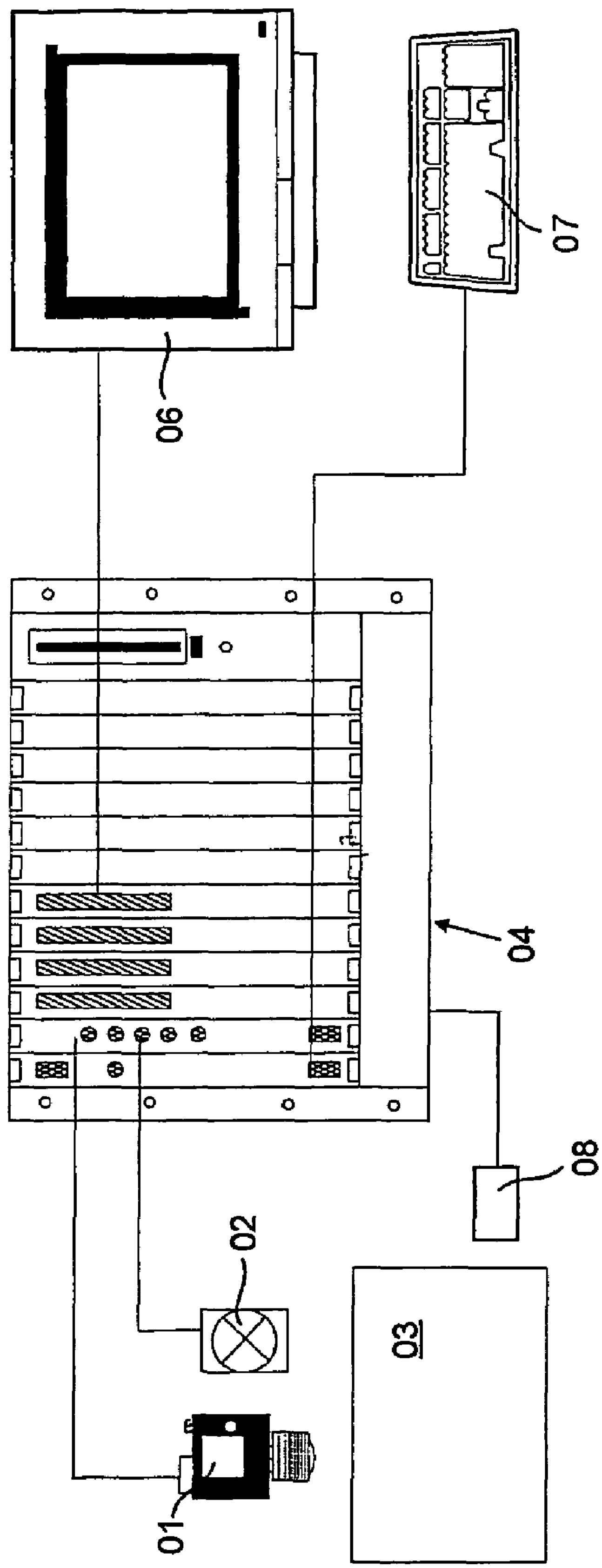
FIG. 1, a schematic representation of an inspection system in accordance with the present invention, and in FIG. 2, a schematic depiction of a sheet with several proof copies.

Referring initially to the schematic representation shown in FIG. 1, an inspection system, which is particularly suited for a printed image check, has a camera 01, such as, for example, one or several color line cameras 01, which are connected to each other, or a color area camera 01, which takes a picture of an image, as illuminated by an illumination arrangement 02, of an imprinted material 03. The imprinted material 03 is preferably embodied as a sheet 03, and the picture is taken after the imprinted material 03, which may be, for example, made of paper, has been imprinted with at least one printed image in a printing press, such as, for example, a rotary printing press, and in particular a sheet-fed rotary offset printing press. The imprinted material 03 is preferably imprinted in a multi-color print in the course of its passage through the printing press. Several color separations, each one of which are differing in the respectively used printing ink which varies in color, and which color separations are to be printed on top of each other, are involved in the production of the printed product.

The image taken by the camera 01 reproduces at least a portion of the imprinted material 03. Data determined by the camera 01 from the picture taken, which data may, for example, correlate with amplitude values of individual color channels, are processed in an image processing system 04. The results of the data processing takes place, for example, on a monitor 06, which monitor 06 is connected with the image processing system 04 that processes the data. Inputs, such as, for example parameters which are necessary to be provided to the image processing system 04 for its calculations, are input through a keyboard 07 which is connected to the image processing system 04.

Figure 2:
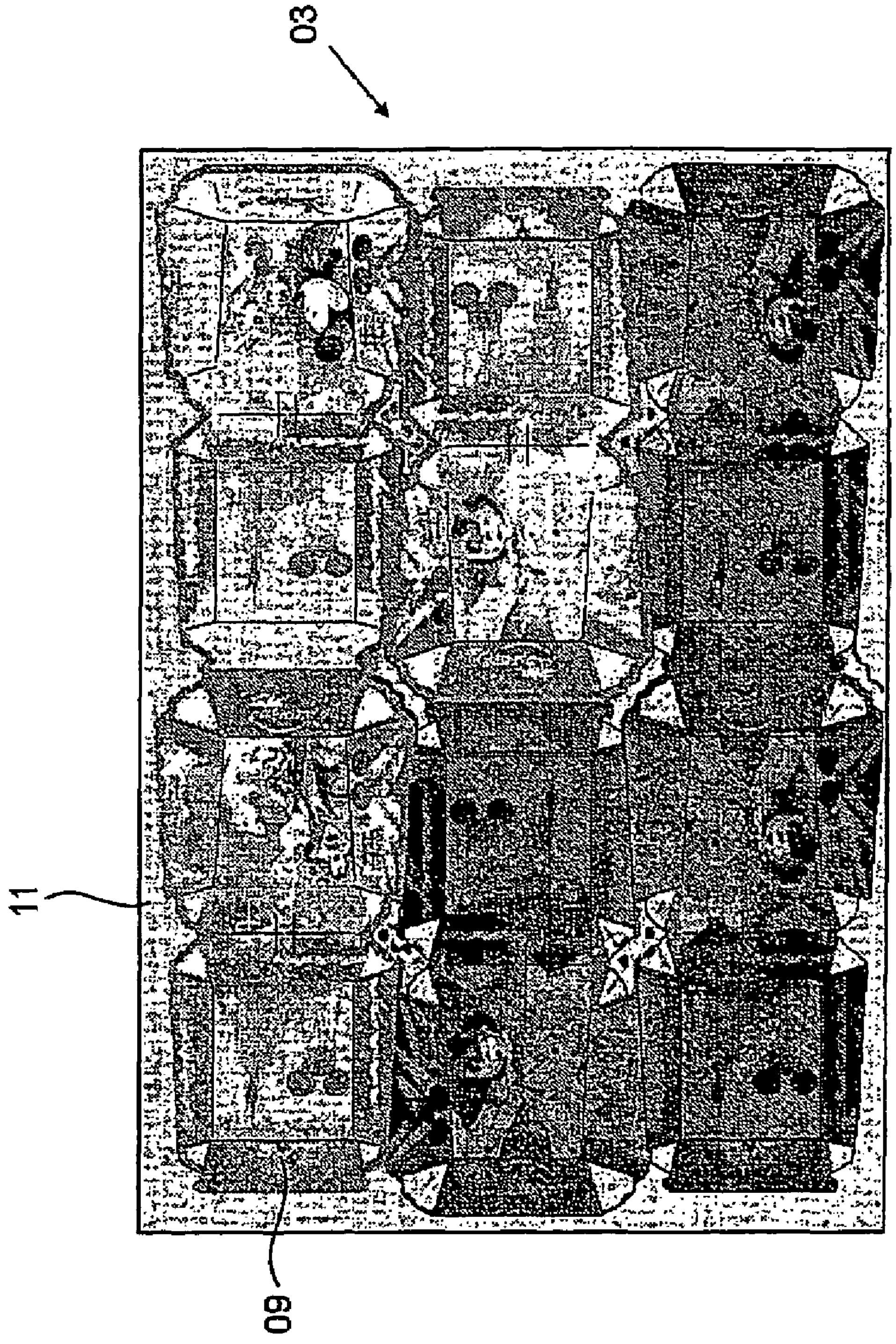

The imprinted material 03, such as in this case, the sheet 03 for example, is imprinted with proof copies on its passage through the printing press and has, as depicted schematically in FIG. 2, several individual proof copies 09 that are connected with each other. The individual proof copies 09 can be repeated. They can also be identical print subjects, which are preferably arranged in a structured array, such as, for example, in a grid shape, i.e. in rows and columns, on the sheet 03. In the preferred embodiment, the proof copies 09, which are arranged on the sheet 03, do not necessarily have to cover the entire area of the sheet 03 which could be imprinted. However, to execute the method of the subject invention, there is no necessity for the proof copies 09, which are arranged on the sheet 03, to be identical in their contours, or for the respective contour of each proof copy 09 to be substantially rectangular, or for the proof copies 09, which are arranged on the sheet 03, to be seamlessly touching. It is also not necessary for the proof copies 09, which are arranged on the sheet 03, to be arranged on sheet 03 in a regular structure, such as, for example, in a grid with a fixed orientation.

If several proof copies 09 of any arbitrary form or of any arbitrary shape, and also with any arbitrary orientation, are arranged on the sheet 03, at least one area 11, such as, for example, an edge 11, results on the sheet 03. In this area 11, an error, which reduces the quality of the printed image, and in particular reduces the quality as a result of printing, does not have a disadvantageous effect. This is because this area 11, or this edge 11, is removed in a process step following printing, in which process step the imprinted sheet 03 is further processed. For this reason, the image of the sheet 03, which was photographically taken by the color line camera 01 or by the color area camera 01, is preferably only evaluated with respect to the proof copies 09 which are arranged on the sheet 03. The area 11, or the edge 11 on the sheet 03, which is located outside the proof copies 09, is not evaluated with respect to errors which would reduce the quality of the printed image.

The selective evaluation of the sheet 03, with respect to at least one error, which error reduces the quality of the printed image, and which may be, for example, an error in color, smudging or any other error, that is inflicted on the sheet 03 prior to, or in particular during the printing process, takes place in such a way that it is determined to which of the proof copies 09, which are arranged on the sheet 03, the error detected by the color line camera 01 or by the color area camera 01, is to be assigned. For this purpose, information regarding the location of the detected error, with respect to the area specified on the sheet 03, and in particular with respect to its imprinted area, is preferably initially provided to the image processing system 04 by an appropriate evaluation of the data that is correlated with the recorded image. For example, the coordinates of the error, which may reduce the quality of the printed image, are localized. The particular proof copy 09, within whose contours the location of the detected error lies, among the proof copies 09 imprinted on the sheet 03 is identified.

An individual proof copy 09 is identified wherein the image processing system 04 places a template, so to speak, over the image taken by the color line camera 01 or by the color area camera 01 of the sheet 03 in the course of its data-processing steps. The template consists of an electronically generated data set. This data set is not taken from a photographically obtained image, and in particular is not obtained within the printing press, but instead is taken from data stored in a pre-print stage. For example, the data set constituting the template is generated by a CAD or computer-aided design system and is provided to a memory, such as, for example, in the pre-print stage. This data set contains information regarding the position, shape, or size, such as, for example, the diameter, of the individual proof copies 09 arranged on the sheet 03, or wherein this information can at least be obtained from the data set. Instead of relating to an absolute position, the information can also relate to the arrangement of the individual proof copies and, in this way, can provide information regarding the position of an individual proof copy 09 in relation to one or to several other proof copies 09. The shape of a proof copy 09 identifies its type or kind, such as, for example a circle, rectangle or another arbitrary geometric shape. In connection with the preferred embodiment of the present invention, the data set is generated in connection with the making of a punch matrix that is intended for use in separating individual proof copies 09 from the sheet 03. This data is sent to the image processing system 04. This step of the present invention is advantageous because recourse can be had to a data set which is already present. An additional outlay for generating this data set does not need to occur. If, on the sheet 03, with the totality of all proof copies 09 arranged thereon, an individual proof copy 09 of a form or shape is arranged, which individual proof copy 09 preferably significantly differs from the other proof copies 09, it is possible, in the course of detecting an error which reduces the quality of the printed image, to draw immediate conclusions regarding the location of the error with respect to this different proof copy 09. This is because this different proof copy 09 has a fixed relationship with the other proof copies 09 which are arranged on the sheet 03.

A specific or definite relationship between an error detected by the color line camera 01 or the color area camera 01 and a proof copy 09 on the sheet 03 can be established by use of the data set constituting the template. The information regarding the arrangement, form or size of the individual proof copies 03, which are arranged on the sheet 03, is superimposed on the data of the image taken by the color line camera 01 or by the color area camera 01, or on at least the information regarding the location of the detected error, for the purpose of a comparison. By the use of a comparison of the information regarding the location of the detected error with the information regarding the arrangement, form or size of the individual proof copies 03 which are arranged on the sheet 03, and with the aid of the data set constituting the template, it is now possible for the image processing system 04 to, for example, unequivocally determine with which one of the proof copies 09, which are arranged on the sheet 03, an error, which was detected and which has been localized on the sheet 03, is associated.

A proof copy 09, which has been identified as having an error which was detected by the color line camera 01 or by the color area camera 01 can be marked, such as, for example, by a marking device 08 which is controlled by the image processing system 04. Such a marking can be accomplished by, for example, the application of a number or of another marking, for example, or the marking can be displayed on the monitor 06, so that the marking of the respective proof copy 09, containing a printed image of defective quality, can also be performed by the operators of the printing press, for example.

The proof copy 09, which is identified on the sheet 03, and within whose contours the error detected by the color line camera 01 or the color area camera 01 is located, can be separated from the remaining proof copies 09 on the sheet, in the course of a processing step following the actual printing process. The proof copies 09, which are arranged on the sheet 03, are punched out, such as, for example, by the use of a punching tool. The proof copy 09, which has the detected error and which has preferably been marked, is extracted, for example by being shunted off. As a result, all of the proof copies 09 arranged on the sheet 03, with the exception of the marked proof copy 09, can be used for their intended purpose, which is advantageous in particular in connection with high quality printed products.

While a preferred embodiment of a method for identifying a single panel or proof copy, comprising a printed image of defective quality, on printed material comprising several panels or proof copies, in accordance with the present invention, has been set forth fully and completely hereinabove, it will be apparent to one of skill in the art that various changes in, for example, the overall size of the printed material, the type of printing technique used to print the panels or proof copies, and the like could be made without departing from the true spirit and scope of the present invention which is accordingly to be limited only by the appended claims.

What is claimed is:

1. A method for identifying a proof copy having a printed image of defective quality including:

providing an imprinted material containing a plurality of proof copies;

taking a photographic image of at least a portion of said imprinted material;

generating data correlated with said photographic image;

checking said generated data and determining the existence of an error reducing the quality of a proof copy of on said printed image on said imprinted material;

providing an electronically generated data set containing information regarding at least one of arrangement, form, and size of said proof copies arranged on said imprinted material;

preparing said electronically generated data set using a process step in which said imprinted material is processed;

generating information regarding a location of said proof copy with said error; and determining a location of said proof copy with said error by comparing said photographic image data and said electronically generated data set.

2. The method of claim 1 further including obtaining said electronically generated data set other than photographically.

3. The method of claim 1 further including producing a punch matrix for separating said proof copies from said imprinted material.

4. The method of claim 1 further including using a CAD system for obtaining said electronically generated data set.

5. The method of claim 1 further including marking said proof copy with said error reducing said quality of said printed image.

6. The method of claim 1 further including applying an identifying marking to said proof copy with said error reducing said quality of said printed image.

7. The method of claim 1 further including providing a monitor and displaying said proof copy with said error reducing said quality of said printed image on said monitor.

8. The method of claim 1 further including separating said proof copy with said error reducing said quality of said printed image from said imprinted material using a punching out process.

9. A method for identifying a proof copy having a printed image of defective quality including:

providing an imprinted material containing a plurality of proof copies;

taking a photographic image of at least a portion of said imprinted material;

generating data correlated with said photographic image;

checking said generated data and determining the existence of an error reducing the quality of a proof copy of said printed image on said imprinted material;

providing an electronically generated data set containing information regarding at least one of arrangement, form, and size of said proof copies arranged on said imprinted material;

generating information regarding a location of said proof copy with said determining a location of said proof copy with said error by comparing said photographic image data and said electronically generated data set; and separating said proof copy with said error reducing said quality of said printed image from remaining ones of said plurality of proof copies on said imprinted material following printing of said imprinted material.

10. The method of claim 9 further including obtaining said electronically generated data set other than photographically.

11. The method of claim 9 further including preparing said electronically generated data set using a process step in which said imprinted materials is processed.

12. The method of claim 9 further including producing a punch matrix for separating said proof copies from said imprinted material, and obtaining said electronically generated data set during said producing of said punch matrix.

13. The method of claim 9 further including using a CAD system for obtaining said electronically generated data set.

14. The method of claim 9 further including marking said proof copy with said error reducing said quality of said printed image.

15. The method of claim 9 further including applying an identifying marking to said proof copy with said error reducing said quality of said printed image.

16. The method of claim 9 further including providing a monitor and displaying said proof copy with said error reducing said quality of said printed image on said monitor.

17. The method of claim 9 further including separating said proof copy with said error reducing said quality of said printed image from said imprinted material using a punching out process.

18. A method for identifying a proof copy having a printed image of defective quality including:

providing an imprinted material containing a plurality of proof copies;

providing an imprinted material inspection system including a camera;

recording an image of individual ones of said plurality of proof copies on said imprinted material using said camera;

making a punch matrix for use in separating said individual ones of said plurality of proof copies from said imprinted material;

providing a data set regarding shapes of said individual ones of said plurality of proof copies using information from said making of said punch matrix;

providing an image processing system; and comparing data from said image of said individual ones of said proof copies and from said data set using said image processing system.

19. The method of claim 18 further including overlying said image with said data set.

20. The method of claim 18 further including using said image processing system and comparing said image with said data set.

21. The method of claim 18 further including providing a marking device, and using said marking device for marking a proof copy not agreeing with said data set.

22. The method of claim 21 further including controlling said marking device using said image processing system.

23. The method of claim 21 further including using said marking device for applying identifying markings to said proof copy having said printed image of defective quality.

24. The method of claim 18 further including providing a monitor and displaying an image of a proof copy having a form not in accordance with said data set on said monitor.

* * * * *

UNITED STATES PATENT AND TRADEMARK OFFICE

CERTIFICATE OF CORRECTION

PATENT NO. : 7,710,595 B2
APPLICATION NO. : 10/591915
DATED : May 4, 2010
INVENTOR(S) : Jens Lochmüller et al.

It is certified that error appears in the above-identified patent and that said Letters Patent is hereby corrected as shown below:

Column 6, in claim 1, line 11, before “said” (first occurrence) delete “on”.

Column 6, in claim 9, lines 58-61 delete in their entirety and substitute

--generating information regarding a location of said proof copy with said error;

determining a location of said proof copy with said error by comparing said photographic image data and said electronically generated data set; and--.

Signed and Sealed this

Tenth Day of August, 2010

David J. Kappos
*Director of the United States Patent and Trademark Office*